Sept. 25, 1951 E. J. FARKAS ET AL 2,568,798
AUTOMATIC TRANSMISSION
Filed Oct. 27, 1945 2 Sheets-Sheet 1

E. J. Farkas
J. W. Rackle
INVENTORS

BY Edwin C. McRae
R. G. Harris
John R. Faulkner
ATTORNEYS

Sept. 25, 1951  E. J. FARKAS ET AL  2,568,798
AUTOMATIC TRANSMISSION

Filed Oct. 27, 1945  2 Sheets-Sheet 2

E. J. Farkas
J. W. Rackle
INVENTORS
Edwin C. McRae
R. E. Harris
John R. Faulkner
ATTORNEYS

Patented Sept. 25, 1951　　　　　　　　　　　　　　　　　　　　　　　　　　2,568,798

UNITED STATES PATENT OFFICE 2,568,798

AUTOMATIC TRANSMISSION

Eugene J. Farkas and Joseph W. Rackle, Detroit, Mich., assignors to Ford Motor Company, Dearborn, Mich., a corporation of Delaware Application October 27, 1945, Serial No. 625,029

10 Claims. (Cl. 74—472)

The invention relates generally to a transmission; and, more particularly, to a manually operated acceleration control for an automatic transmission by means of which a transition to a lower speed ratio can be made to obtain greater acceleration.

The present invention comprises an improvement of the automatic transmission disclosed in the copending application of Eugene J. Farkas, Serial No. 611,975, filed August 22, 1945. The transmission of the said copending application includes a multiple planetary gearing system adapted to transmit torque at three different speed ratios, with the transition from first to second speed, and from second to third speed, taking place automatically by the operation of second and third speed clutches which are activated by fluid under pressure supplied by a fluid pump and regulated by governor controlled hydraulic valve means. In that construction, an accelerating valve was provided adjacent the fluid pump and arranged to control the flow of fluid from the pressure side of the pump to the third speed clutch. The valve plunger was suitably linked to the vehicle accelerator pedal for operation thereby, and during normal accelerator travel permitted a flow of fluid to the third speed clutch. When additional acceleration was desired, requiring the use of the second speed gear ratio, the accelerator pedal was completely depressed, causing the accelerating valve to interrupt the flow of fluid to the third speed clutch.

The present invention incorporates an improved accelerating valve in which the transmission can be shifted, not only from third to second speed, but also from second to first speed in the event additional acceleration is desired necessitating the use of the first speed ratio.

It is therefore an object of the present invention to provide an automatic transmission having externally operable means effective to change the transmission speed ratio from second to first speed when additional acceleration is desired.

A further object is to provide an automatic transmission with a single externally operable means effective to change the transmission ratio from third to second speed to obtain additional acceleration, and also effective to change the transmission ratio from second to first speed when operating conditions require the acceleration available in the lower speed ratio.

Another object is to provide for selective reduction of speed ratios in an automatic transmission for acceleration purposes with a minimum of working parts and without substantially increasing the cost of the transmission.

Still another object is to provide an acceleration control for effecting a reduction in the transmission speed ratio which is operated by depression of the accelerator pedal beyond the normal operating travel. In addition, the construction is designed so that the fluid pump is effective at speeds above a certain amount to generate sufficient pressure to cause the transmission to be operated in the second speed ratio even when the accelerator pedal is maintained in its completely depressed position.

Other objects and advantages of the present invention will be made more apparent as this description proceeds, particularly when considered in connection with the accompanying drawings, in which.

Figure 1:
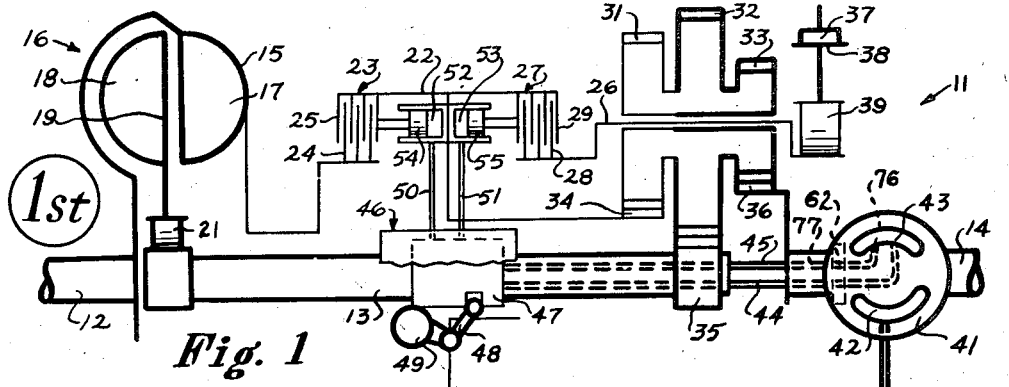
Figure 1 is a longitudinal vertical schematic drawing of the transmission, illustrating particularly the power flow therethrough in low or first speed ratio.

It will be noted that the general construction of the transmission is shown schematically in the drawings, reference being made to the said copending application, Serial No. 611,975, now Patent No. 2,528,584, issued November 11, 1950, for a more detailed illustration of the mechanism.

Figure 2:
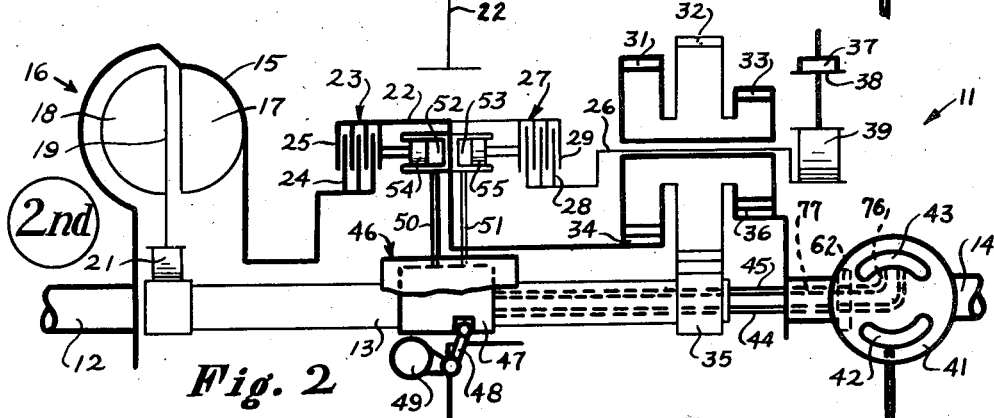
Figures 2 and 3 are schematic views similar to Figure 1, but showing the power flow through the transmission in second and third speed ratios, respectively.
Figure 3:
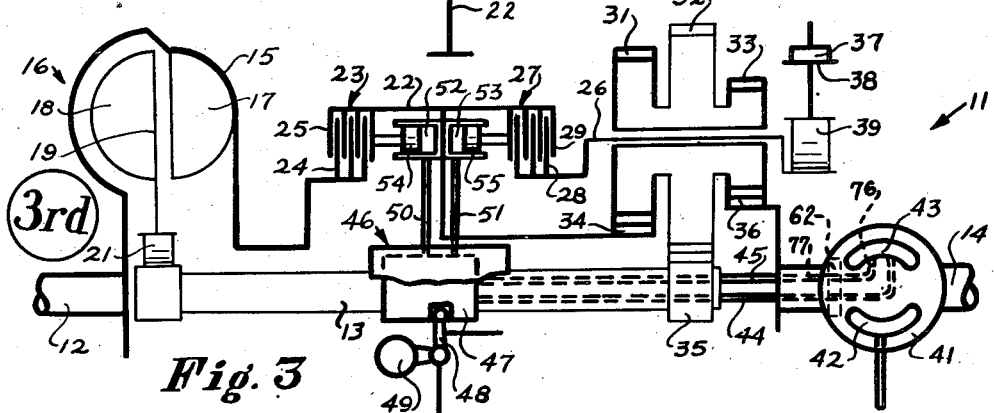

Referring now to the drawings and, more particularly, to Figures 1, 2 and 3, the reference character 11 indicates generally an automatic transmission having a drive shaft 12 connected to the crankshaft of the engine, a main shaft 13, and a load shaft 14 adapted to be connected to the rear axle drive means. Attached to the drive shaft 12 is the impeller housing 15 of a fluid coupling 16. The impeller housing has a series of vanes 17 cooperating in the usual manner with the vanes 18 in the runner housing 19. The runner housing 19 is connected to the main shaft 13 by an overrunning clutch 21.

The impeller housing 15 is adapted to be operatively connected to a clutch carrier 22 by means of a second speed clutch 23, the latter including clutch discs 24 and 25 operatively connected to the impeller housing 15 and the clutch carrier 22, respectively. The clutch carrier 22 is also adapted to be locked to the planet carrier 26 by means of a third speed clutch 27, the latter including clutch discs 28 and 29 operatively connected to the planet carrier 26 and the clutch carrier 22, respectively. The second and third speed clutches are adapted to be actuated automatically by hydraulic mechanism to be described later.

The planet carrier 26 is mounted for rotation about the axis of the main shaft 13, and carries clusters of planet pinions 31, 32 and 33. Planet pinion 31 is adapted to mesh with a sun gear 34 carried by the clutch carrier 22. Planet pinion 32 is arranged to mesh with a sun gear 35 mounted on the main shaft 13, and planet pinion 33 with sun gear 36, the latter being carried by the load shaft 14.

Reverse rotation of the planet carrier 26 can be selectively prevented by means of the forward speed brake 37, which functions to lock the brake drum 38 to the transmission housing. Connection from the brake drum 38 to the planet carrier 26 is made through an overrunning clutch 39.

Fluid pressure for operating the second and third speed clutches is provided by a fluid pump 41 driven by the load shaft 14. Fluid is supplied to the suction intake 42 of the pump 41 and is delivered under pressure by the pump to the pressure chamber 43.

As diagrammatically shown in Figure 1, fluid under pressure from the pressure chamber 43 of the pump is transmitted through conduits 44 and 45 to the valve 46. The sleeve 47 of the valve is adapted to be reciprocated by the bell crank 48 pivotally mounted on the clutch carrier 22. The bell crank 48 carries centrifugal weights 49 which are moved outwardly by centrifugal force as the clutch carrier is rotated. Under certain conditions of speed the conduits 44 and 45 are adapted to be connected by the valve 46 to the conduits 50 and 51, respectively, which communicate with cylinders 52 and 53 formed in the clutch carrier 22. Mounted within the cylinders 52 and 53 are pistons 54 and 55, respectively.

When actuated by fluid pressure, the second speed piston 54 is adapted to force the clutch discs 24 and 25 of the second speed clutch into frictional engagement with each other, and to thus lock the impeller housing 15 to the clutch carrier 22. In like manner, the third speed piston 55 is adapted to engage clutch discs 28 and 29 of the third speed clutch 27 to lock the clutch carrier 22 to the planet carrier 26.

Figure 1 shows the operation of the transmission in low or first speed ratio, during which the rotational speed of the clutch carrier is low enough so that the weights 49 are not substantially displaced and the valve sleeve 47 is so positioned in the valve 46 that there is no fluid communication between the conduits 44 and 45 and the conduits 50 and 51, respectively. Accordingly, neither the second speed clutch 23 nor the third speed clutch 27 are operated.

Under these conditions, rotation of the drive shaft 12 is imparted to the impeller housing 15 and transmitted by hydraulic reaction to the runner housing 19 and through the overrunning clutch 21 to the main shaft 13. The forward speed brake 37 is actuated, preventing, through the overrunning clutch 39, reverse rotation of the planet carrier 26. With the planet carrier thus locked against reverse rotation, torque is transmitted from the sun gear 35 on the main shaft 13 to the planet pinion 32 and then from planet pinion 33 to the sun gear 36 on the load shaft 14, at the maximum speed reduction. Inasmuch as the sun gear 34 on the clutch carrier 22 is in constant mesh with the planet pinion 31, the clutch carrier is rotated, but since both clutches 23 and 27 are disengaged there is no reaction, and the maximum engine torque is transmitted to the load shaft in the forward direction and at low or first speed ratio.

As the rotational speed of the clutch carrier 22 increases, radial displacement of the centrifugal weights 49 is effective to move the valve sleeve 47 and to establish fluid communication between the conduit 44 from the pump and the conduit 50 leading to the piston 54 of the second speed clutch, engaging the discs 24 and 25. The third speed clutch remains disengaged.

As seen in Figure 2, actuation of the second speed clutch 23 locks the drive shaft 12 and the impeller housing 15 to the clutch carrier 22. The carrier, in turn, drives its sun gear 34 and the triple planetary pinion through the pinion 31. The drive is again taken from the planet pinion 33 to its sun gear 36 on the load shaft 14. Inasmuch as the forward speed brake 37 is engaged, reverse rotation of the planet carrier 26 is prevented, so that forward rotation at an intermediate speed ratio is imparted to the load shaft. Although the main shaft 13 is rotated through pinion 32 and sun gear 35, the overrunning clutch 21 disconnects the runner housing 19 and permits the latter to rotate freely. The drive is therefore entirely mechanical and the fluid coupling is inoperative.

With a further increase in the rotational speed of the clutch carrier 22, the centrifugal weights 49 undergo further radial displacement, moving the valve sleeve 47 to a position such that fluid communication is established between the conduit 45 from the pump and the conduit 51 leading to the piston 55 of the third speed clutch 27. The valve 46 is so constructed that in this position of the valve sleeve, fluid communication is still maintained between conduits 44 and 50 and the second speed clutch remains engaged. Actuation of piston 55 is effective to engage the clutch discs 28 and 29 of the third speed clutch and to lock the clutch carrier 22 to the planet carrier 26. As illustrated in Figure 3, this results in the rotation as a unit of the clutch carrier, planet carrier, and the triple planetary pinion. Accordingly, a direct drive is established from the drive shaft 12 to the load shaft 14, thus transmitting torque at engine speed in the forward direction.

From the foregoing, it will be seen that the transition from first to second speed, and from second to third speed, is automatically effected as the speed of the vehicle increases. The mechanism is similarly automatically operative to effect a downward transition from third to second speed, and from second to first speed, as the speed of the vehicle decreases. Under certain conditions, however, additional acceleration is desired beyond that which can be obtained in the particular speed ratio at which the transmission is automatically operating due to the speed at that moment. For example: when the vehicle is operating on an incline or hill, in either second or third speed, a demand for additional acceleration often requires that the transmission be immediately shifted to a lower speed ratio. The present invention provides means whereby the transmission can be selectively shifted from third to second speed, or from second to first speed, by manual operation by the driver of either the accelerator controls or any other suitable control means.

Figure 4:
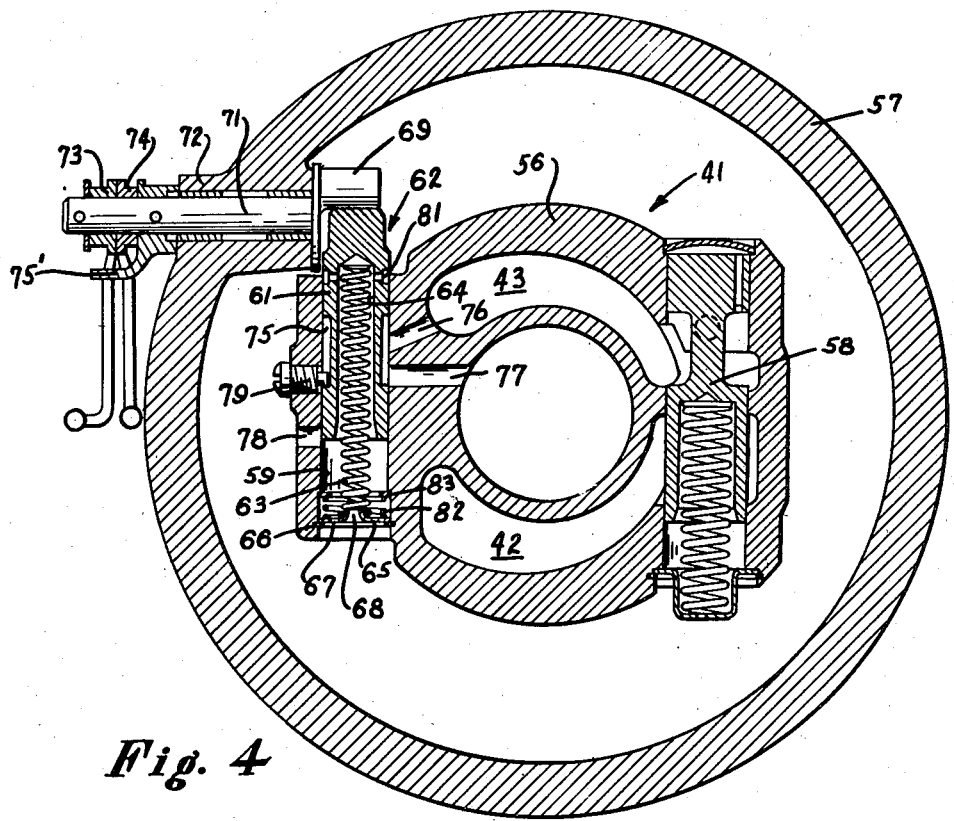
Figure 4 is a transverse sectional view through the fluid pump and accelerating valve.

Referring to Figure 4, the fluid pump 41 is shown more in detail, and comprises a pump housing 56 carried within the rearward end of the transmission casing 57. Interposed in the pump housing 56 between the suction intake 42 and the pressure chamber 43 is a spring loaded pressure relief valve 58. The pressure in the pressure chamber 43 acts upon the upper head of the relief valve and tends to move the valve downwardly in Figure 4, and when the pressure is sufficient to overcome the resistance of the spring establishes temporary communication between the pressure and suction chambers. This limits the pressure in chamber 43 to a predetermined amount.

The opposite side of the pump housing 56 is provided with a vertical bore 59 within which is reciprocably mounted the plunger 61 of an accelerating valve 62. The plunger is normally urged upwardly by means of a coil spring 63, which has its upward end seated in a bore 64 in the plunger and its lower end seated upon a retainer 65, the latter being held in place in the bore 59 by the removable ring 66. It will be noted that the retainer 65 is provided with a plurality of ports 67 adjacent its periphery, and also has a fluid opening 68 through its cup-shaped central portion. Fluid communication is thus provided between the interior of the bore 59 past the retainer 65 to the interior of the transmission casing 57.

The upper end of the plunger 61 engages an eccentric cam 69 carried by the control rod 71 journaled in a boss 72 on the transmission casing. Two control arms 73 and 74 are rotatably mounted on the control rod 71 and are connected to the accelerator pedal and a manual control, respectively. A dog 75' is pinned to the control rod 71 and arranged so that independent movement of either control arm 73 or 74 will be transmitted to the cam 69.

Intermediate its ends, the plunger 61 is provided with an annular peripheral chamber 75 which is adapted in the normal operating position of the plunger to establish communication between ports 76 and 77 in the pump housing 56. Port 77 communicates with conduit 45, Figure 1, and thus supplies fluid under pressure from the pressure chamber 43 of the pump to the third speed clutch 27 through the valve 46. Communication between ports 76 and 77 is maintained throughout the normal range of travel of the accelerator pedal in the third speed range and the resultant depression of plunger 61 by the cam 69. It will readily be apparent, however, that further depression of the accelerator pedal or further operation of the manual control will be effective to depress the accelerating valve plunger to the position shown in Figure 5, in which port 76 is completely closed by the plunger. In this position of the plunger, the annular chamber 75 in the plunger provides communication between port 77 and the exhaust port 78 which opens directly into the interior of the transmission casing. The fluid under pressure in the third speed conduits 45 and 51, and the third speed cylinder 53, is thus exhausted and the third speed clutch 27 disengaged. This releases the clutch carrier 22 from locking engagement with the planet carrier 26, and results in immediately shifting the transmission from third to second speed. Thus, when the vehicle is operating in third speed and additional acceleration is desired, it is only necessary for the driver to depress the accelerator pedal beyond its normal operating stroke to effect an immediate transition from third to second speed, permitting the required acceleration. It will be noted that when the accelerator pedal is released, upper movement of plunger 61 by the coil spring 63 is limited by the stop 79.

Figures 5, 6:
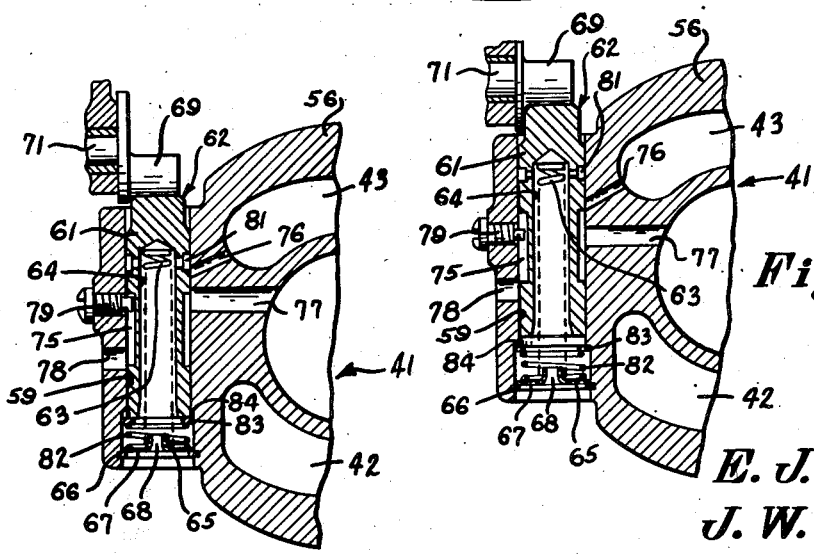
Figures 5 and 6 are fragmentary transverse sectional views similar to a portion of Figure 4, but illustrating different operative positions of the accelerating valve.

Spaced axially from the upper end of the annular chamber 75 in the accelerating valve plunger 61 is an annular peripheral port 81 connected by radial passages to the bore 64 provided in the plunger. Referring to Figure 6, it will be seen that still further depression of the accelerator pedal is effective through the eccentric cam 69 to depress the plunger 61 to a position such that the port 81 is in alignment with port 76, communicating with the pressure chamber 43 of the pump. By providing the annular peripheral port 81, communication between the bore 64 and the port 76 is insured regardless of the radial position of the plunger.

In the position shown in Figure 6, communication is established between the pressure chamber 43 of the pump and the interior of the transmission casing. The fluid flow is from the pressure chamber through ports 76 and 81 to the bore 64 in the plunger and then to the interior of the transmission casing through the port 67 and opening 68 provided in the retainer 65.

Opening the pressure chamber of the pump to the exhaust will—below a predetermined rotational speed of the pump—reduce the pump pressure to such an amount that the second speed clutch 23 is disengaged. It will be noted that depression of the accelerating valve plunger to the position shown in Figure 6, in which ports 76 and 81 are aligned, is resisted not only by the coil spring 63 but also by an additional spring 82, interposed between the retainer 65 and a ring 83 normally seated upon a shoulder 84 provided in the bore 59.

Figure 7:
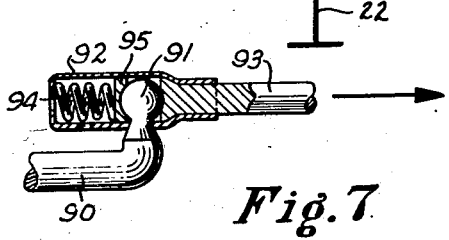
Figure 7 is a fragmentary cross-sectional view of a coupling in the accelerator linkage.

The construction thus described permits the driver to effect an immediate transition of the transmission from second speed to first speed in the event additional acceleration is desired beyond that which can be obtained in second speed under the then existing operating conditions. The shift from second to first speed is effected by an operation of the accelerator pedal beyond the operation thereof necessary to effect a shift from third to second speed. This additional movement is resisted by both spring 63 and spring 82 and, accordingly, requires additional physical effort on the part of the driver. Inadvertent depression of the accelerator pedal to the point necessary to open the pressure chamber of the pump to exhaust is thus prevented. If desired, this final movement of the accelerator pedal can also be resisted by means of spring loaded couplings in the accelerator linkage, with the linkage arranged so that the spring loaded couplings must be compressed to secure the additional movement of the accelerator pedal. Figure 7 illustrates a coupling conventionally used in the linkage system between the accelerator pedal and the carburetor of the vehicle engine. The coupling comprises a pair of links 90 and 93 held together by a resilient connection so as to be normally nonextensible, yet adapted to be extended upon the application of sufficient tension. Link 90 has a ball shaped end 91 received within a sleeve 92 carried at the end of link 93. A coil spring 94 and washer 95 in the sleeve 92 normally hold the links in the relative position shown. The coupling however is yieldable under sufficient tension, so that the accelerator pedal can be moved beyond its normal range by the application of sufficient pressure. This additional pedal movement moves the rotary valve to a position enabling a downward shift to first speed to be made.

By properly designing the accelerating valve, the rate of exhaustion of fluid from the pressure chamber 43 can be limited so that when the pump is operating at a rotational speed greater than a predetermined amount, the pressure generated by the pump will be sufficient to actuate the second speed clutch, even though the pressure chamber is open to exhaust. Inasmuch as the pump is driven directly by the load shaft 14 of the transmission, its speed is proportional to the speed of the vehicle and the pressure generated thereby is also proportional to vehicle speed, being limited only by the pressure relief valve 58. A valuable safety feature is provided by this construction, since the disengagement of the second speed clutch and the resultant shifting of the transmission at low speed is prevented when the vehicle is traveling faster than a certain speed. Thus, at higher speeds, even though the accelerator pedal is depressed to the point such that the pressure chamber 43 of the pump is open to exhaust, the transmission will remain in second speed and will not shift to low. It likewise follows that after a transition has been made from second to low speed by complete depression of the accelerator pedal—to obtain greater acceleration—the transmission will automatically be shifted upwardly to second speed, even though the accelerator pedal is maintained depressed, when the vehicle speed increases sufficiently such that the pressure generated by the pump is adequate to operate the second speed clutch, even though the pressure chamber may be opened to exhaust.

It will be noted that the construction described above provides for selective shifting from third to second speed, and from second to first speed, to obtain greater acceleration, without substantially increasing the number of working parts in the transmission. Maintenance is thus simplified and, likewise, the initial cost is reduced.

Although we have shown and described certain embodiments of the invention, it will be understood that we do not wish to be limited to the exact construction shown and described, but that various changes and modifications may be made without departing from the spirit and scope of our invention, as defined in the appended claims.

What we claim is:

1. In a variable speed power transmission for a vehicle engine having an accelerator, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation and automatically operable under predetermined conditions to change from one speed ratio to another, conduits leading to said fluid pressure means, a pump having fluid outlets supplying fluid under pressure to said conduits, a valve having a reciprocable plunger provided with a passage normally establishing communication between one of said pump outlets and one of said conduits, accelerator controlled means for reciprocating said valve plunger and effective upon a predetermined movement thereof to interrupt the flow of fluid from said last-mentioned pump outlet to effect a change from one speed ratio to a lower speed ratio, said valve plunger also having an exhaust passage axially spaced from said first-mentioned passage and adapted upon further movement of the plunger to communicate with said last-mentioned pump outlet to exhaust the pressure side of said pump and to effect a change from said lower speed ratio to a still lower speed ratio.

2. In a variable speed power transmission for a vehicle engine having an accelerator having a predetermined normal range of travel and also adapted to be selectively moved beyond said normal range, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation and automatically operable under predetermined conditions to change from one speed ratio to another, conduits leading to said fluid pressure means, a pump having fluid outlets supplying fluid under pressure to said conduits, a valve having a reciprocable plunger provided with an axially extending passage normally establishing communication between one of said pump outlets and one of said conduits to effect operation of said gearing at one speed ratio, accelerator controlled means for reciprocating said valve plunger arranged so that during the normal range of accelerator travel said axially extending passage maintains communication between said last-mentioned pump outlet and said last-mentioned conduit, said valve plunger being effective upon an additional movement thereof to interrupt the flow of fluid from said last-mentioned pump outlet to effect a change from said speed ratio to a lower speed ratio, said valve plunger also having an exhaust passage axially spaced from said first-mentioned passage and adapted upon further movement of the plunger to communicate with said last-mentioned pump outlet to exhaust the pressure side of said pump and to effect a change from said lower speed ratio to a still lower speed ratio.

3. In a variable speed transmission, in combination, a housing, a power shaft, a load shaft, a fluid coupling having one element fixed for rotation with said power shaft, a multiple planetary gearing system comprising a carrier and planet pinions and sun pinions having one element thereof fixed for rotation with said load shaft, a power transmitting member interposed between said fluid coupling and said planetary gearing system and arranged for selective operation therewith, means rendering said member inoperative with respect to said fluid coupling and said planetary gearing system and to transmit torque in one direction through said coupling and said planetary gearing system at one speed ratio, means to lock said member to said power shaft and said planetary gearing system to effect differential rotation thereof and transmit torque at another speed ratio in said one direction, means to lock said member to said power shaft and said planetary gearing system to effect common rotation thereof and transmit torque at a third speed ratio in said one direction, means rendering said fluid coupling inoperative while torque is transmitted at said last two speed ratios, hydraulic means for operating said last two locking means, conduits leading to said hydraulic means, a pump supplying activating fluid under pressure to said conduits, and externally operable means to release the pressure supplied by said pump to release one of said locking means to effect a change from one speed ratio to a lower speed ratio.

4. In a variable speed transmission, in combination, a housing, a power shaft, a load shaft, a fluid coupling having one element fixed for rotation with said power shaft, a multiple planetary gearing system comprising a carrier and planet pinions and sun pinions having one element thereof fixed for rotation with said load shaft, a power transmitting member interposed between said fluid coupling and said planetary gearing system and arranged for selective operation therewith, means rendering said member inoperative with respective to said fluid coupling and said planetary gearing system and to transmit torque in one direction through said coupling and said planetary gearing system at one speed ratio, means to lock said member to said power shaft and said planetary gearing system to effect differential rotation thereof and transmit torque at another speed ratio in said one direction, means to lock said member to said power shaft and said planetary gearing system to effect common rotation thereof and transmit torque at a third speed ratio in said one direction, means rendering said fluid coupling inoperative while torque is transmitted at said last two speed ratios, hydraulic means for operating said last two locking means, conduits leading to said hydraulic means, a pump supplying activating fluid under pressure to said conduits, and externally operable means effective when said member is locked to said power shaft and said planetary gearing system and torque is being transmitted at said second speed ratio to exhaust the pressure side of said pump to release the means locking said member to said power shaft and said planetary gearing system to effect a change from said second speed ratio to said first speed ratio.

5. The structure of claim 4 which is further characterized in that said externally operable means comprises a valve, and a reciprocable plunger for said valve having an exhaust passage adapted upon a predetermined movement of said plunger to communicate with the pressure side of said pump.

6. The structure of claim 4 which is further characterized in that said pump is driven by said load shaft and is effective upon a certain rotational speed of said load shaft to generate sufficient pressure to operate said first-mentioned locking means even when said externally operable means is in position to open the pressure side of said pump to exhaust.

7. The structure of claim 4 which is further characterized in that said externally operable means comprises a valve having three operable positions, namely, a first position establishing communication between said pump and the hydraulic means operating the second-mentioned locking means, a second position interrupting the flow of fluid under pressure to said last-mentioned hydraulic means, and a third position opening the pressure side of said pump to exhaust.

8. Control means for a variable speed transmission for a vehicle engine having an accelerator, said transmission having two fluid pressure actuated clutches, comprising a pump, separate conduits from said two clutches communicating with said pump, an accelerator controlled valve associated with only one of said conduits and arranged upon a predetermined movement of said valve to interrupt the flow of fluid through said last-mentioned conduit to release the clutch connected thereto, and passage means in said valve arranged upon a further movement of said valve to connect said pump to exhaust and thereby release said other clutch.

9. Control means for a variable speed transmission mechanism for a vehicle engine having an accelerator, said transmission having fluid pressure operated clutch elements, comprising a pump housing, a pump within said housing having an intake chamber connected to a fluid source and a pressure chamber, a valve mounted in said pump housing a conduit establishing communication between the pressure chamber of said pump and one of said clutch elements independently of said valve, a conduit establishing communication from the pressure chamber of said pump to another of said clutch elements through said valve, and accelerator controlled means for operating said valve to shift said valve between positions interconnecting said pressure chamber to said last-mentioned conduit, interrupting communication between said pressure chamber and said last-mentioned conduit, and interconnecting said pressure chamber to exhaust.

10. Control means for a variable speed transmission mechanism for a vehicle engine having an accelerator, said transmission having fluid pressure operated clutch elements, comprising a pump housing, a pump within said housing having an intake chamber connected to a fluid source and a pressure chamber connected to said clutch elements, a reciprocable plunger type valve mounted in a bore in said pump housing, passages in said pump housing interconnecting said bore to said pressure chamber, to one of said clutch elements and to exhaust, passages in said valve plunger arranged to interconnect certain of the passages in said pump housing in certain valve positions to control said clutch elements, and accelerator controlled means for shifting said valve plunger between said valve position.

EUGENE J. FARKAS.
JOSEPH W. RACKLE.

REFERENCES CITED

The following references are of record in the file of this patent:

UNITED STATES PATENTS

| Number | Name | Date |
|---|---|---|
| 963,092 | Sundh | July 5, 1910 |
| 1,609,782 | Small et al. | Dec. 7, 1926 |
| 2,103,540 | Livermore | Dec. 28, 1937 |
| 2,151,714 | Pavesi | Mar. 28, 1939 |
| 2,163,202 | Kegresse | June 20, 1939 |
| 2,169,639 | Grote | Aug. 15, 1939 |
| 2,221,393 | Carnegie | Nov. 12, 1940 |
| 2,319,388 | Cotterman | May 18, 1943 |
| 2,329,724 | Maurer | Sept. 21, 1943 |
| 2,353,905 | Kelley | July 18, 1944 |
| 2,371,574 | Swennes | Mar. 13, 1945 |
| 2,376,545 | Livermore | May 22, 1945 |